(12) United States Patent
Bateni et al.

(10) Patent No.: US 8,290,913 B2
(45) Date of Patent: Oct. 16, 2012

(54) TECHNIQUES FOR MULTI-VARIABLE ANALYSIS AT AN AGGREGATE LEVEL

(75) Inventors: Arash Bateni, Toronto (CA); Edward Kim, Toronto (CA)

(73) Assignee: Teradata US, Inc., Dayton, OH (US)

( * ) Notice: Subject to any disclaimer, the term of this patent is extended or adjusted under 35 U.S.C. 154(b) by 248 days.

(21) Appl. No.: 11/967,673

(22) Filed: Dec. 31, 2007

(65) Prior Publication Data
US 2009/0172017 A1 Jul. 2, 2009

(51) Int. Cl.
*G06F 7/00* (2006.01)
(52) U.S. Cl. ..................................... 707/687
(58) Field of Classification Search .............. 707/687
See application file for complete search history.

(56) References Cited

U.S. PATENT DOCUMENTS

| | | |
|---|---|---|
| 6,078,901 A | 6/2000 | Ching |
| 6,647,371 B2 | 11/2003 | Shinohara |
| 6,751,574 B2 | 6/2004 | Shinohara |
| 2004/0049470 A1 | 3/2004 | Ouimet |
| 2007/0033185 A1 | 2/2007 | Maag |
| 2007/0244589 A1 | 10/2007 | Oku et al. |
| 2008/0168004 A1* | 7/2008 | Kagarlis et al. ............. 705/36 R |

OTHER PUBLICATIONS

Jean-Pierre Dube (Multiple Discreteness and Production Differentiation: Demand for Carbonated Soft Drinks, vol. 23 No. 1 Winter 2004, pp. 66-81).*
"U.S. Appl. No. 11/967,673, Response to Final Office Action mailed Jul. 19, 2010", 10 pgs.

* cited by examiner

*Primary Examiner* — Truong Vo
(74) *Attorney, Agent, or Firm* — Schwegman, Lundberg & Woessner

(57) ABSTRACT

Techniques for multi-variable analysis at an aggregate level are provided. Two or more datasets having different statistical data distributions and which are not capable of being aggregated are acquired. The values for variables in the two or more datasets are normalized to produce a single integrated dataset of normalized values. The normalized values are then used to produce a demand model that represents and integrates multiple disparate products or services from the two or more datasets into a single demand model.

21 Claims, 9 Drawing Sheets

ILLUSTRATION OF DIFFERENT NORMALIZING METHODS

SUMMARY OF RESULTS:
- THE PROMO UPLIFT AT THE DATA SET LEVEL (BEFORE AGGREGATION) IS 3, CALCULATED AS AVERAGE PROMO DEMAND/AVERAGE REGULAR DEMAND
- THREE ALTERNATIVES ARE INVESTIGATED FOR CALCULATION OF UPLIFTS AT THE AGGREGATE LEVEL:
  A. THE REGRESSION MODEL FOR THE MULTIPLICATIVE EQUATION IS: LOG(DEMAND) = A + b.(PROMO_FLAG) OR DEMAND = EXP(A).EXP(B.PROMO_FLAG)
  C. NORMALIZING USING THE PROPOSED METHOD (BASE = AVERAGE REGULAR DEMAND)
  C. NORMALIZING USING AN ALTERNATIVE METHOD (BASE = AVERAGE DEMAND)
- THE PROMO UPLIFT AT THE AGGREGATE LEVEL IS CALCULATED AS FOLLOWS:
  A. CALCULATE REGRESSION COEFFICIENTS AS LOG(DEMAND) = A + B(PROMO_FLAG) OR DEMAND = EXP(A).EXP(B.PROMO_FLAG)
  B. CALCULATE THE UPLIFT AS L = EXP(B)
- THE RESULTS SHOW THAT THE CORRECT UPLIFT (I.E. 3) AT THE AGGREGATION LEVEL IS DERIVED ONLY WHEN THE PROPOSED NORMALIZING MODEL IS USED.

| ORIGINAL DATA | | | MULTIPLICATIVE MODEL | | NORMALIZED PROPOSED METHOD | | NORMALIZED ALTERNATIVE METHOD | |
|---|---|---|---|---|---|---|---|---|
| DATA SET | DEMAND | PROMO | D | LOG(DN) | DN | LOG(DN) | DN | LOG(DN) |
| 1 | 10 | 0 | 10 | 2.30 | 1 | 0.00 | .056 | -0.59 |
| 1 | 10 | 0 | 10 | 2.30 | 1 | 0.00 | .056 | -0.59 |
| 1 | 10 | 0 | 10 | 2.30 | 1 | 0.00 | .056 | -0.59 |
| 1 | 10 | 0 | 10 | 2.30 | 1 | 0.00 | .056 | -0.59 |
| 1 | 30 | 1 | 30 | 3.40 | 3 | 1.10 | 1.67 | 0.51 |
| 1 | 30 | 1 | 30 | 3.40 | 3 | 1.10 | 1.67 | 0.51 |
| 1 | 30 | 1 | 30 | 3.40 | 3 | 1.10 | 1.67 | 0.51 |
| 1 | 10 | 0 | 10 | 2.30 | 1 | 0.00 | .056 | -0.59 |
| 1 | 10 | 0 | 10 | 2.30 | 1 | 0.00 | .056 | -0.59 |
| 2 | 50 | 0 | 50 | 3.91 | 1 | 0.00 | 0.83 | -0.18 |
| 2 | 50 | 0 | 50 | 3.91 | 1 | 0.00 | 0.83 | -0.18 |
| 2 | 150 | 1 | 150 | 5.01 | 3 | 1.10 | 2.50 | 0.92 |
| 2 | 50 | 0 | 50 | 3.91 | 1 | 0.00 | 0.83 | -0.18 |
| 2 | 50 | 0 | 50 | 3.91 | 1 | 0.00 | 0.83 | -0.18 |
| 2 | 50 | 0 | 50 | 3.91 | 1 | 0.00 | 0.83 | -0.18 |
| 2 | 50 | 0 | 50 | 3.91 | 1 | 0.00 | 0.83 | -0.18 |
| 2 | 50 | 0 | 50 | 3.91 | 1 | 0.00 | 0.83 | -0.18 |
| 2 | 50 | 0 | 50 | 3.91 | 1 | 0.00 | 0.83 | -0.18 |

Fig. 6

| | | B | A | B | A | B | A |
|---|---|---|---|---|---|---|---|
| DATASET 1 | REGRESSION COEFFICIENTS | 1.10 | 2.30 | 1.10 | 0.00 | 1.10 | -0.59 |
| | UPLIFT RESULT | 3.00 UNBIASED | | 3.00 UNBIASED | | 3.00 UNBIASED | |
| DATASET 2 | REGRESSION COEFFICIENTS | 1.10 | 3.91 | 1.10 | 0.00 | 1.10 | -0.18 |
| | UPLIFT RESULT | 3.00 UNBIASED | | 3.00 UNBIASED | | 3.00 UNBIASED | |

AGGREGATE RESULTS

| | B | A | B | A | B | A |
|---|---|---|---|---|---|---|
| REGRESSION COEFFICIENTS | 0.45 | 3.27 | 1.10 | 0.00 | 0.94 | -0.34 |
| UPLIFT RESULT | 1.58 BIASED | | 3.00 UNBIASED | | 2.55 BIASED | |

*Fig. 7*

ILLUSTRATION OF DIFFERENT NORMALIZING METHODS

SUMMARY OF RESULTS:
• THE PROMO UPLIFT AT THE DATA SET LEVEL (BEFORE AGGREGATION) IS 3, CALCULATED AS AVERAGE PROMO DEMAND/AVERAGE REGULAR DEMAND
• ADDITIVE AND MULTIPLICATIVE REGRESSION MODELS ARE COMPARED (NORMALIZED DEMAND IS USED FOR BOTH MODELS):
  A. THE REGRESSION MODEL FOR THE MULTIPLICATIVE EQUATION IS: LOG(DEMAND) = A + b.(PROMO_FLAG) OR DEMAND = EXP(A).EXP(B.PROMO_FLAG)
  B. THE REGRESSION MODEL FOR THE MULTIPLICATIVE EQUATION IS: DEMAND = A + b.(PROMO_FLAG)
• THE PROMO UPLIFT AT THE AGGREGATE LEVEL IS CALCULATED AS FOLLOWS:
  A. MULTIPLICATIVE MODEL: L = EXP(B)
  B. ADDITIVE MODEL: L = (A+B)/A
• THE RESULTS SHOW THAT THE CORRECT UPLIFT (I.E. 3) AT THE AGGREGATION LEVEL IS DERIVED ONLY WHEN THE MULTIPLICATIVE MODEL IS USED.

| ORIGINAL DATA | | | MULTIPLICATIVE MODEL | | | | |
|---|---|---|---|---|---|---|---|
| DATA SET | DEMAND | PROMO | DN | LOG(DN) | | DN | |
| 1 | 10 | 0 | 1 | 0.00 | | 1 | |
| 1 | 10 | 0 | 1 | 0.00 | | 1 | |
| 1 | 10 | 0 | 1 | 0.00 | | 1 | |
| 1 | 30 | 1 | 3 | 1.10 | | 3 | |
| 1 | 30 | 1 | 3 | 1.10 | | 3 | |
| 1 | 30 | 1 | 3 | 1.10 | | 3 | |
| 1 | 10 | 0 | 1 | 0.00 | | 1 | |
| 1 | 10 | 0 | 1 | 0.00 | | 1 | |
| 2 | 50 | 0 | 1 | 0.00 | | 5 | |
| 2 | 50 | 0 | 1 | 0.00 | | 5 | |
| 2 | 150 | 1 | 3 | 1.10 | | 15 | |
| 2 | 50 | 0 | 1 | 0.00 | | 5 | |
| 2 | 50 | 0 | 1 | 0.00 | | 5 | |
| 2 | 50 | 0 | 1 | 0.00 | | 5 | |
| 2 | 50 | 0 | 1 | 0.00 | | 5 | |
| 2 | 50 | 0 | 1 | 0.00 | | 5 | |
| 2 | 50 | 0 | 1 | 0.00 | | 5 | |

DATASET RESULTS

| REGRESSION COEFFICIENTS | B | A | | B | A |
|---|---|---|---|---|---|
| SET 1 | 1.10 | 0.00 | | 2.00 | 1.00 |

Fig. 10

TECHNIQUES FOR MULTI-VARIABLE ANALYSIS AT AN AGGREGATE LEVEL

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals: such as planning, analytics, reporting, etc.

Many times the information stored and indexed is created, mined, updated, and manipulated by application programs created by developers on behalf of analysts.

Often these mining applications desire to aggregate and combine a variety of different data within databases of the enterprise.

Data aggregation is a process in which several datasets are combined and analyzed together, to generate overall results. This process is of particular interest in Demand Chain Management (DCM) applications because of the hierarchical nature of the data. Typical examples are aggregation of data over merchandise and/or location hierarchies.

Performing multi-variable analysis (e.g. multi-regression) at an aggregate level may be required due to various reasons, in particular scarcity of data at low levels of hierarchy.

A variety of issues arise when data is scarce, such as statistical applications can become less reliable. Thus, enterprises attempt to aggregate data from different levels of the hierarchy in an attempt to improve the reliability of enterprise applications by increasing the data points being used with those applications.

But, not just any type of data can be combined. Furthermore, conventional data aggregation approaches are almost exclusively manual processes, because fields of the database from different tables need to be associated and mapped for proper aggregation and heretofore there has been decent automated manner in which to achieve this.

Therefore, it can be seen that improved techniques for aggregating data, which is used as input into database applications, are needed.

SUMMARY

In various embodiments, techniques for multi-variable analysis at an aggregate level are provided. According to an embodiment, a method for data aggregation is described. Multiple datasets associated with one or more relational databases are identified. Data associated with each of the multiple datasets is normalized to produce a single normalized dataset. Finally, a multiplicative regression analysis algorithm is applied to the normalized data in the single normalized dataset to produce a demand model that incorporates the multiple datasets.

BRIEF DESCRIPTION OF THE DRAWINGS

FIGS. 4-10 depict graphs and data related to various aspects of embodiments presented herein and below.

DETAILED DESCRIPTION

Multi-variable analysis on aggregated data is essential for Demand Chain Management (DCM) applications. As described in detail below, such an analysis can be achieved in an automated manner using various statistical and mathematical implementations in a computer-readable environment. With this, data aggregation may often lead to inaccurate and to biased results.

Embodiments of this invention provide an implementation framework for data aggregation and multi-variable analysis on aggregated data. It covers a variety of topics such as: the errors involved in data aggregation, the normalizing process and formulation, and mathematical (regression) equations that can be used to model the aggregated data.

Reasons for Data Aggregation

Data aggregation is a process in which several datasets are combined and analyzed together, to produce overall results.

Data aggregation is of particular interest in Teradata Demand Chain Management (TDCM), due to the hierarchical nature of the data (e.g. merchandise and location hierarchies).

Performing multi-variable analysis (e.g. multi-regression) at an aggregate level may be required due to various reasons:

Data scarcity: when enough history (e.g. sales data) is not available at low levels of hierarchy.

New variables: when a new influencing variable (e.g. a new advertising method), or a new value for a variable (e.g. a new price value) is introduced for a product.

Nature of the problem: when an analysis is intended be performed over a group of products (e.g. event shifting should be done for a group of products that have the same profile).

Issues Regarding Multi-Variable Analysis at an Aggregate Level

Primary issues: mathematical formulations and procedures that allow the analysis at the aggregate level:

Combining different datasets; and

Underlying (regression) model.

Secondary issues: methods and considerations that improve the accuracy/efficiency of the analysis at the aggregate level. Examples of such issues are:

when an aggregation is needed;

what is the optimum aggregation path (e.g. whether we should aggregate over merchandise or location hierarchy);

what is the optimum aggregation level; and performing an outlier analysis for aggregated data (e.g. whether outliers should be removed before or after aggregation).

The techniques presented herein provide an implementation framework to deal with the primary issues discussed above.

Errors Involving Data Aggregation at an Aggregate Level

Generally data aggregation involves two types of error:

data scarcity error: the error due to scarcity of the data points at the lower levels of hierarchy; and aggregation error: the error caused by combining several (similar but not identical) datasets at the aggregation level.

The above errors work in opposite directions: data scarcity tends to decrease at higher levels of hierarchy, where more data points are available; while aggregation error increases at such levels, as more datasets are combined.

Figure 4:
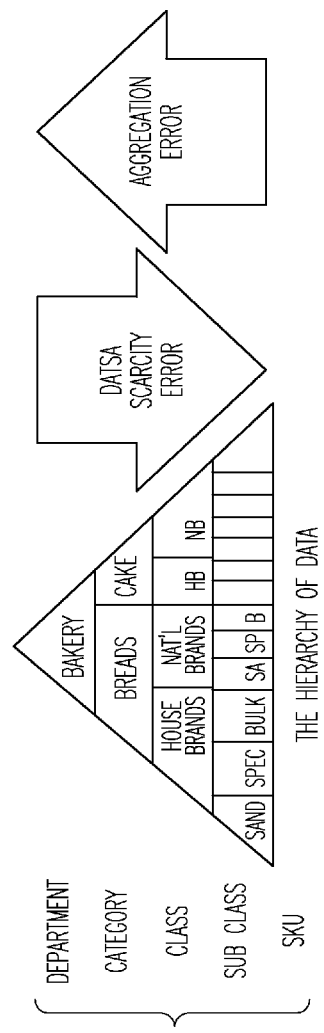
Figure 5:
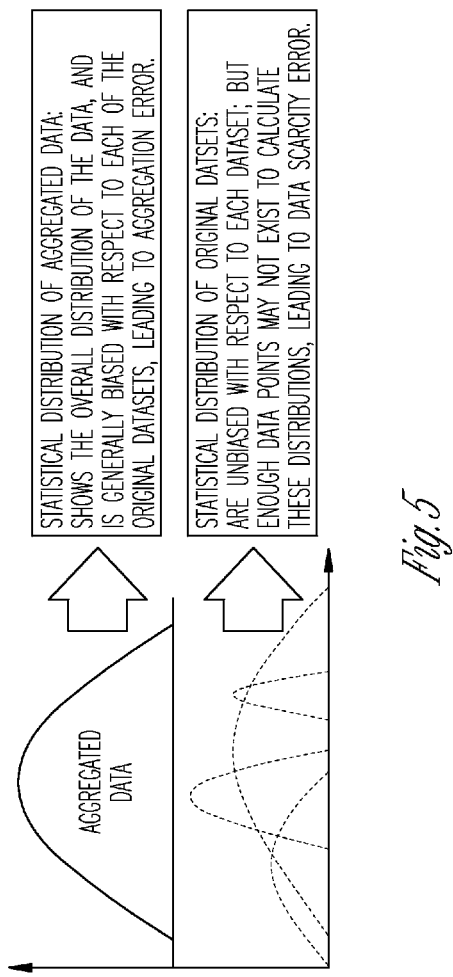

Decisions regarding aggregation (e.g. the optimum aggregation level) require understanding and measuring these two errors. Such decisions are data-dependant and should be made case by case. Mathematical techniques like analysis of variance (ANOVA), multi-regression, and error analysis are recommended for this purpose. FIGS. 4-5 depict illustrations of errors involving data aggregation.

A primary challenge in data aggregation is to find a method to combine several datasets with different statistical distributions.

A normalizing technique is proposed here for this purpose.

Each variable is normalized by dividing over a base value. The average of the variable for regular weeks can serve as the base value without introducing a bias.

The following formula is used to normalize variable i of a given dataset ds:

$$\mathrm{var}_{i,ds}^n = \frac{\mathrm{var}_{i,ds}}{\mathrm{mean}(\mathrm{var}_{i,ds,reg})}$$

Note1: any transformation of data, including normalizing, requires a reverse transformation of the results, after the analysis is performed.

Note2: the presented formula maps the regular data points to unity (1), see the illustration that follows.

Figure 8:
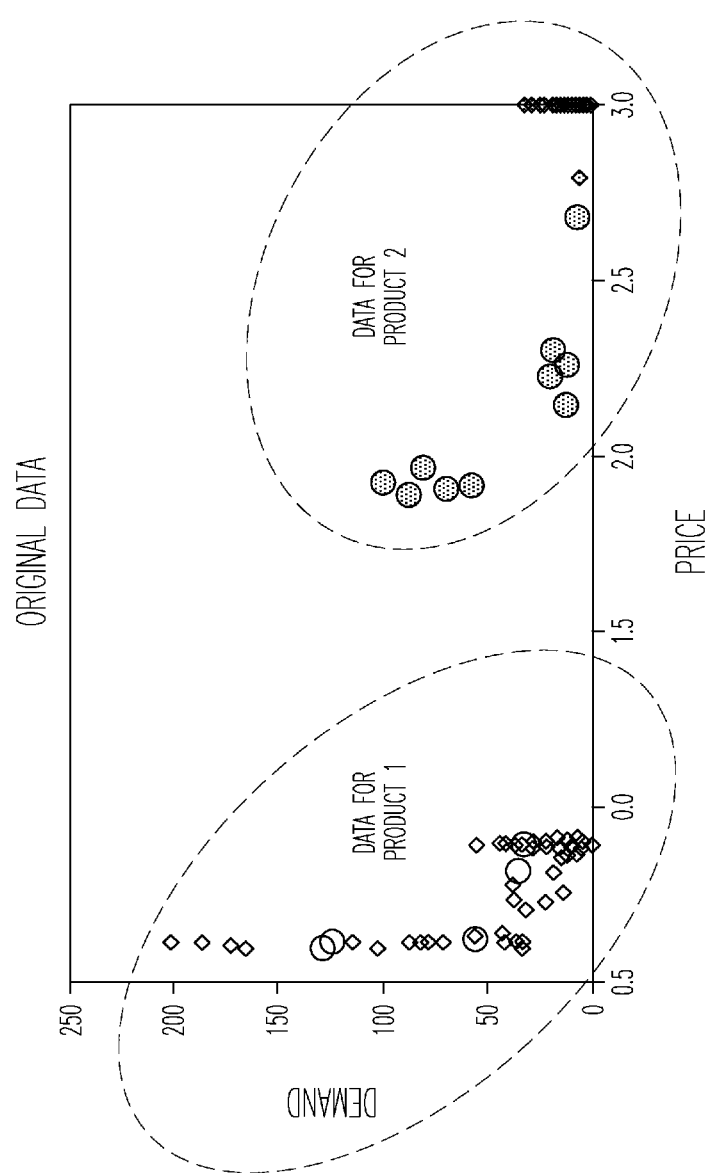
Figure 9:
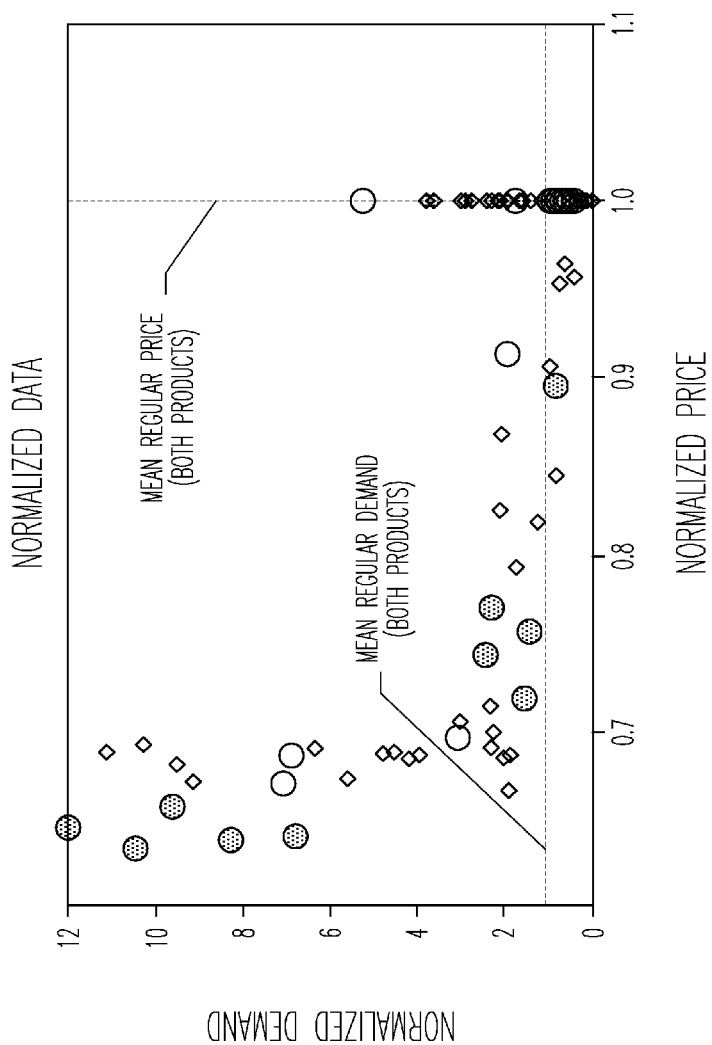

Note3: employing other normalizing formula (e.g. a different base) may lead to bias results (see below). FIG. 6 shows an illustration for different normalization methods. FIG. 7 shows some data results for an example. FIGS. 8-9 show illustrations of data normalization.

The Illustrations show the effect of normalizing process on two datasets: products 1 and 2.

The price and demand of the two products cover different ranges before normalizing, so they cannot be combined for any multi-variable analysis.

After normalization, the two datasets coincide. Thus, various multi-variable analysis, such as calculation of overall price elasticity or promotional uplift, can be performed.

Note: dots and circles indicate regular and promotional demands, respectively.

Underlying Mathematical Model

Either additive or multiplicative models can be used to conduct a multi-variable analysis for non-aggregated datasets.

The additive model defines the effect of the causal factors as an additive uplift while the multiplicative model defines that as a percentage change in demand:

Additive: dmnd=base+price effect+promo effect+ events effect+

Multiplicative: dmnd=base*price effect*promo effect*events effect*

It is shown mathematically that only multiplicative models can be used at an aggregate level (see below).

Depending on the nature of the data, these models can be defined in one of the following ways; also, following these ways see FIG. 10 for an illustration of multiplicative versus additive models and data results for a sample scenario.

Figure 1:
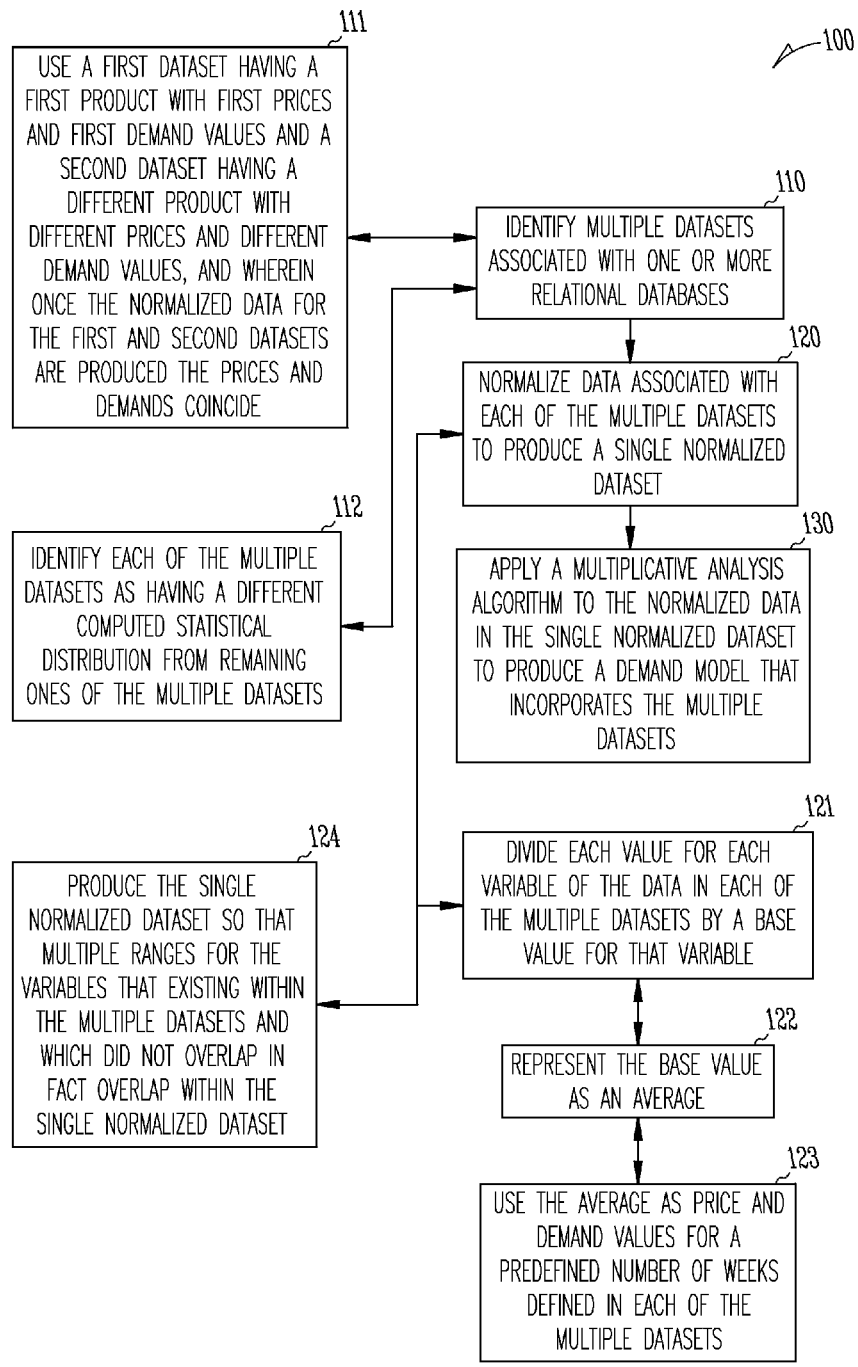
FIG. 1 is a diagram of a method for data aggregation, according to an example embodiment.
Figure 2:
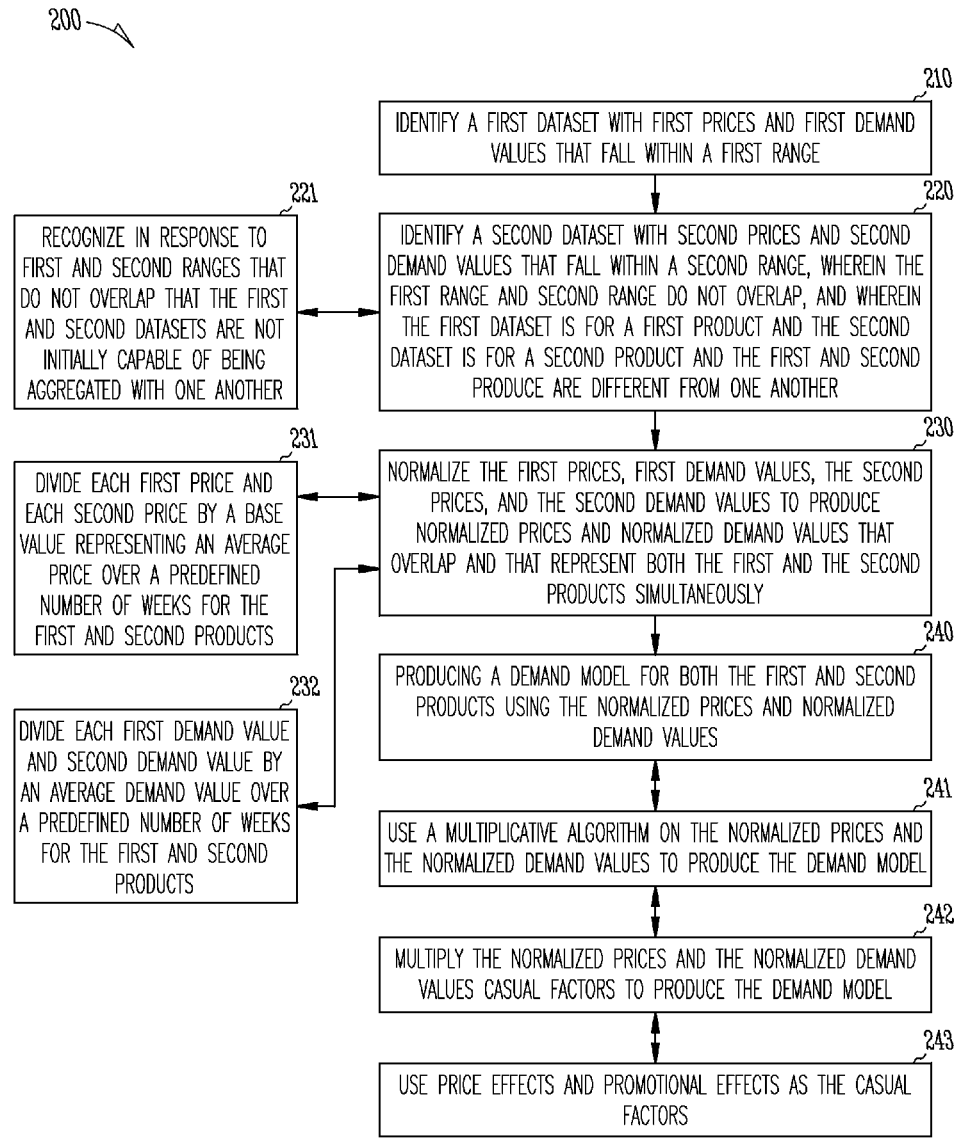
FIG. 2 is a diagram of another method for data aggregation, according to an example embodiment.
Figure 3:
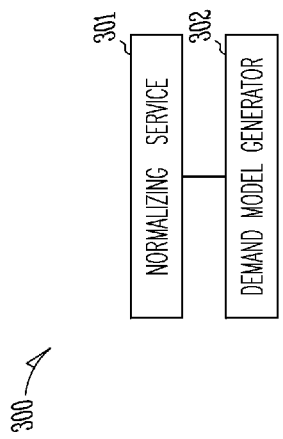
FIG. 3 is a diagram of a database aggregation system, according to an example embodiment.

It is within this context that a some example embodiments of the details discussed and illustrated above are now presented with reference to the FIGS. 1-3.

FIG. 1 is a diagram of a method 100 for data aggregation, according to an example embodiment. The method 100 (hereinafter "data aggregation service") is implemented in a machine-accessible or computer-readable medium as instructions that when executed by a machine (e.g., computer, processing device, etc.) performs the processing depicted in FIG. 1. Moreover, the data aggregation service is accessible over a network. The network may be wired, wireless, or a combination of wired and wireless.

A "database" as used herein is a relational database, or a collection of databases organized as a data warehouse. According to an embodiment, the database is a Teradata® product or service distributed by Teradata of Dayton, Ohio.

The database includes a variety of enterprise information organized in tables. One type of information is referred to as an "entity." An entity is something that can be uniquely identified (e.g., a customer account, a customer name, a store, a product, a household name, a logical grouping of certain types of customers, etc.). Each entity includes related information such as sales, expenses, inventories, transaction history, etc. In fact, the relationships and types of information can vary and can be configured in any manner desired by an enterprise.

At 110, the data aggregation service identifies multiple datasets associated or extracted from one or more relational databases. The datasets can include data related to demand forecasting, such as prices and demand values for a particular product or service of an enterprise. The products or services are different from one another, such that in a normal situation these datasets are not capable of being aggregated with one another.

Thus, according to an embodiment, at 111, the data aggregation service uses a first dataset having first price values and first demand values for a first product and uses a second dataset having second price values and second demand values for a second product. The first and second price and demand values are different from one another as is the first and second product. Moreover, as discussed in more detail below, the various prices and demand values coincide with one another once they are normalized with the processing of 120.

Stated another way, at 112, the data aggregation service identifies each of the multiple datasets as having a different computed statistical distribution from remaining ones of the multiple datasets. Correspondingly, in a conventional scenario these datasets were not capable of being aggregated with one another for purposes of analysis.

It is also noted that although the discussion herein and above discussed aggregating multiple variables from two datasets that are not under normal circumstances capable of being aggregated, this does not always have to be the case. In other words, three or more datasets and their corresponding variables and data can be used with the teachings presented herein.

At 120, the data aggregation service normalizes data associated with each of the multiple datasets to produce a single normalized dataset having normalized values for variables associated with each of the multiple normalized datasets.

In an embodiment, at 121, the data aggregation service divides each value for each variable of the data in each of the multiple datasets by a base value for that variable. This base value provides a mechanism by which variables and values for those variables can be aggregated, which under normal conventional circumstances was not possible.

Specifically in a case, at 122, the data aggregation service represents the base value as an average. For example, at 123, the data aggregation service uses the average as price and demand values for a predefined number of weeks defined in each of the multiple datasets.

Also, at 124, the data aggregation service produces the single normalized dataset so that multiple ranges for the variables that existed within the multiple datasets and which did not overlap in fact overlap within the single normalized dataset. Essentially, multiple disparate data distributions were combined into a single normalized dataset with normalized values during the normalizing process.

At 130, the data aggregation service applies a multiplicative regression analysis algorithm to the normalized data in the single normalized dataset to produce a demand model that incorporates the multiple datasets.

In an embodiment (discussed in greater detail below with reference to the FIGS. 1 and 2), the data aggregation service uses a multiplicative algorithm or technique when producing the demand model.

FIG. 2 is a diagram of another method 200 for a data aggregation service, according to an example embodiment. The method 200 (hereinafter "aggregation service") is implemented in multiple machine-accessible and readable media as instructions that when executed by machines perform the processing reflected in FIG. 2. The aggregation service is accessible over a network. The network may be wired, wireless, or a combination of wired and wireless.

The aggregation service presents an enhanced view and different aspect of the data aggregation service presented above and represented by the method 100 of the FIG. 1.

At 210, the aggregation service identifies a first dataset with first prices and first demand values that fall within a first range.

Also, at 220, the aggregation service identifies a second dataset with second prices and second demand values that fall within a second range. The first range and second range do not overlap, and the first dataset is for a first product and the second dataset is for a second product. The first and second produce are different from one another.

It is noted that the data sets do not have to be limited to products as services sold by an enterprise or used by a government or agency may be used as well.

In an embodiment, at 221, the aggregation service recognizes (in response to first and second ranges that do not overlap) that the first and second datasets are not initially capable of being aggregated with one another. In other words the statistical data distributions in the first and second datasets do not overlap or in a conventional sense are not capable of being aggregated for purposes of demand analysis.

At 230, the aggregation service normalizes the first prices, first demand values, the second prices, and the second demand values to produce normalized prices and normalized demand values that overlap and that represent both the first and the second products simultaneously. So, after the normalization multiple disparate and initially incompatible variables from multiple datasets (extracted from one or more relational databases—in some cases two or more relational databases) are combined in a single dataset for demand analysis.

According to an embodiment, at 231, the aggregation service divides each first price and each second price by a base value, which represents an average price over a predefined number of weeks for the first and second products. The details of this were discussed at length above with the discussion that preceded the discussion of the FIG. 1.

Similarly, at 232, the aggregation service divides each first demand value and second demand value by an average demand value over a predefined number of weeks for the first and second products. Again, the formula and detail for this normalization was presented above.

At 240, the aggregation service produces a demand model for both the first and second products using the normalized prices and normalized demand values.

In an embodiment, at 241, the aggregation service includes uses a multiplicative algorithm on the normalized prices and the normalized demand values to produce the demand model. At 242, the aggregation service multiplies the normalized prices and the normalized demand values by a number of casual factors to produce the demand model. Also, at 243, the aggregation service uses price effects and promotional effects as the casual factors. Examples of this were provided above in the discussion that preceded the discussion of the FIG. 1.

FIG. 3 is a diagram of a database aggregation system 300, according to an example embodiment. The database aggregation system 300 is implemented in a machine-accessible and readable media and is operational over a network and processed by multiple machines of the network. The network may be wired, wireless, or a combination of wired and wireless. In an embodiment, portions of the data aggregation system 300 implements, among other things the data aggregation service and the aggregation service represented by the methods 100 and 200 of the FIGS. 1 and 2, respectively.

The database aggregation system 300 includes a normalizing service 301 and a demand model generator 302. Each of these and their interactions with one another will now be discussed in turn.

The normalizing service 301 is implemented in a machine-accessible and computer-readable medium and is to process on a machine (computer or processing device) of the network. Example processing associated with the normalizing service 301 was provided above in detail with reference to the discussion that preceded the figures and with respect to the FIGS. 1 and 2 of the methods 100 and 200, respectively.

The normalizing service 301 normalizes price and demand values that occur in two non-aggregated datasets into a single integrated and normalized set of prices and demands that are in essence aggregated together.

The two non-aggregated datasets have a different statistical distribution from the other. So, under normal conventional approaches these two datasets could not have been aggregated for purposes of analysis. However, with the teachings presented herein, the data associated with these two datasets are integrated via the normalization of the normalization service 301 for purpose of demand model generation performed by the demand model generator 302.

According to an embodiment, each of the prices and demand values from each of the two non aggregated datasets are normalized by the normalizing service 301 using a calculated base that is used as a denominator. The calculated base is an average for the prices and the demand values.

The demand model generator 302 is also implemented in a machine-accessible and computer-readable medium and is to process on the same machine as the normalizing service 301 or an entirely different machine of the network. Example processing associated with the demand model generator 302 was provided above in detail with reference to the discussion that preceded the figures and with respect to the FIGS. 1 and 2 of the methods 100 and 200, respectively.

The demand model generator 302 uses the normalized set of the prices and the demands to produce a single integrated demand model for the two non aggregated datasets, which are associated with two different products or services of an enterprise.

In an embodiment, the demand model generator 302 produces the demand model using an multiplicative technique. The multiplicative technique multiples the normalized prices against casual factors to generate the demand model. Again, the details of this as well as illustrative examples were provided above in detail with the discussion that preceded the discussion of the FIG. 1.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
identifying multiple datasets associated with one or more relational databases, wherein identifying further includes using a first dataset having a first product with first prices and first demand values and a second dataset having a different product with different prices and different demand values, and wherein once the normalized data for the first and second datasets are produced the prices and demands coincide;
normalizing data associated with each of the multiple datasets to produce a single normalized dataset by at least in part dividing each first price and each different price by an average first price and different price for every first price in the first dataset and for every different price in the second dataset to produce a normalized first price and normalized different price for each first price and different price in the normalized data, dividing each first demand value and different demand value by an average first demand value and different demand value for every first demand value in the first dataset and for every different demand value in the second dataset to produce a normalized first demand value and different demand value in the normalized data; and
applying a multiplicative regression analysis algorithm to the normalized data in the single normalized dataset to produce a demand model that incorporates the multiple datasets.

2. The method of claim 1, wherein identifying further includes identifying each of the multiple datasets as having a different computed statistical distribution from remaining ones of the multiple datasets.

3. The method of claim 1, wherein normalizing further includes dividing each value for each variable of the data in each of the multiple datasets by a base value for that variable.

4. The method of claim 3, wherein dividing further includes representing the base value as an average.

5. The method of claim 4, wherein representing further includes using the average as price and demand values for a predefined number of weeks defined in each of the multiple datasets.

6. The method of claim 1, wherein normalizing further includes producing the single normalized dataset so that multiple ranges for the variables that existed within the multiple datasets and which did not overlap in fact overlap within the single normalized dataset.

7. The method of claim 1, wherein the first product and the different product are products of a single enterprise, and wherein the demand model is a single integrated demand model for the first and second datasets.

8. A machine-implemented method, comprising:
identifying a first dataset with first prices and first demand values that fall within a first range;
identifying a second dataset with second prices and second demand values that fall within a second range, wherein the first range and second range do not overlap, and wherein the first dataset is for a first product and the second dataset is for a second product and the first and second products are different from one another;
normalizing the first prices, first demand values, the second prices, and the second demand values to produce normalized prices and normalized demand values that overlap and that represent both the first and the second products simultaneously by at least in part dividing each first price and each second price in the first and second datasets by an average of every first price in the first dataset and every second price in the second dataset to produce a normalized first price and a normalized second price in the normalized prices and also dividing each first demand value and each second demand value in the first and second datasets by an average of every first demand value in the first dataset and every second demand value in the second dataset to produce a normalized first demand value and a normalized second demand value in the normalized demand values; and
producing a demand model for both the first and second products using the normalized prices and normalized demand values.

9. The method of claim 8 further comprising, recognizing in response to first and second ranges that do not overlap that the first and second datasets are not initially capable of being aggregated with one another.

10. The method of claim 8, wherein normalizing further includes dividing each first price and each second price by a base value representing an average price over a predefined number of weeks for the first and second products.

11. The method of claim 8, wherein normalizing further includes dividing each first demand value and second demand value by an average demand value over a predefined number of weeks for the first and second products.

12. The method of claim 8, wherein producing further includes using a multiplicative algorithm on the normalized prices and the normalized demand values to produce the demand model.

13. The method of claim 12, wherein using further includes multiplying the normalized prices and the normalized demand values by casual factors to produce the demand model.

14. The method of claim 13, wherein multiplying further includes using price effects and promotional effects as the casual factors.

15. The method of claim 8, wherein the first product and the second product are products of a single enterprise, and wherein the demand model for both the first and second products is a single integrated demand model.

16. A system comprising:
a normalizing service implemented in a machine-accessible and computer-readable medium and to process on a machine; and
a demand model generator implemented in a machine-accessible and computer-readable medium and to process on the machine or a different machine;
wherein the normalizing service is to normalize price and demand values that occur in two non aggregated datasets into a single integrated and normalized set of prices and demands that are aggregated together, and wherein the demand model generator is to use the normalized set of the prices and the demands to produce a single integrated demand model for the two non aggregated datasets, which are associated with two different products or services of an enterprise, the normalized set of prices and demands computed based on an average price for the two non-aggregated datasets and based on an average demand value for the two non-aggregated datasets.

17. The system of claim 16, wherein each of the two non aggregated datasets have a different statistical distribution from the other.

18. The system of claim 16, wherein each of the prices and demand values from each of the two non aggregated datasets are normalized by the normalizing service using a calculated base that is used as a denominator.

19. The system of claim 16, wherein the calculated base is an average for the prices and the demand values.

20. The system of claim 19, wherein the demand model generator produces the demand model using an multiplicative technique.

21. The system of claim 20, wherein the multiplicative technique multiples the normalized prices against casual factors to generate the demand model.

* * * * *